United States Patent [19]
Safonov

[11] Patent Number: 5,892,951
[45] Date of Patent: Apr. 6, 1999

[54] METHOD AND APPARATUS FOR EFFICIENT EVALUATION OF SEMANTIC ATTRIBUTES IN LALR PARSING

[75] Inventor: Vladimir Olegovich Safonov, St. Petersburg, Russian Federation

[73] Assignee: Sun Microsystems, Inc., Palo Alto, Calif.

[21] Appl. No.: 586,234

[22] Filed: Jan. 12, 1996

[30] Foreign Application Priority Data

Oct. 24, 1995 [RU] Russian Federation ............. 95118249

[51] Int. Cl.[6] ........................................ G06F 9/45
[52] U.S. Cl. ........................................ 395/708; 395/705
[58] Field of Search .................... 395/705, 708, 395/707; 364/419.08; 704/1, 2, 4, 9

[56] References Cited

U.S. PATENT DOCUMENTS

| | | | |
|---|---|---|---|
| 4,398,249 | 8/1983 | Pardo | 364/300 |
| 4,989,145 | 1/1991 | Kyushima | 364/419 |
| 5,086,504 | 2/1992 | Nemeth-Johannes et al. | 395/700 |
| 5,261,103 | 11/1993 | Takeuchi et al. | 395/700 |
| 5,418,717 | 5/1995 | Su et al. | 364/419.08 |
| 5,487,000 | 1/1996 | Takahashi et al. | 364/419.08 |

FOREIGN PATENT DOCUMENTS 0732-834 A3 11/1989 European Pat. Off. ........ G06F 9/455

OTHER PUBLICATIONS

Vladimir Olegovich Safonov, Programming Languages and Techniques for the Elbrus System, Moscow, Nauka Publishers (1989—in Russian).

Gregor V. Bochmann, "Semantic Evaluation from Left to Right," Communications of the ACM, Feb. 1976, vol. 19, No. 2, pp. 55–62.

Donald E. Knuth, "Semantics of Context–Free Languages," Mathematical Systems Theory, Mar. 1968, vol. 2, No. 2, pp. 127–145.

Primary Examiner—Tariq R. Hafiz
Assistant Examiner—Kakali Chaki
Attorney, Agent, or Firm—Graham & James LLP

[57] ABSTRACT

A method and apparatus for compiling source code that pre-evaluates certain semantic attributes during syntactical analysis. The invention performs certain type of semantic analysis, such as checking semantic attributes, during the operation of the syntactical analyzer, while the parse tree is being built, instead of waiting to perform these checks in a separate pass through the parse tree during semantic analysis. The present invention modifies the format of nodes in the parse tree to include fields for semantic attributes and modifies the actions associated with grammar productions so that they create parse tree nodes of the correct format. In addition, the present invention includes semantic attribute routines that determine the attribute values to store in the parse tree for the various semantic attributes.

19 Claims, 10 Drawing Sheets

Attributed Syntax Tree
for an assignment

Semantic Attribute Routine

METHOD AND APPARATUS FOR EFFICIENT EVALUATION OF SEMANTIC ATTRIBUTES IN LALR PARSING

RELATED APPLICATIONS

The following applications, which are filed concurrently herewith, are related to the subject application, and are expressly incorporated by reference.

1) U.S. application Ser. No. 08/585,805, now U.S. Pat. No. 5,701,490 (Russian Application Serial No. 95118250) of Vladimir O. Safonov entitled "Method and Apparatus for Compiler Symbol Table Organization With No Lookup in Semantic Analysis."

2) U.S. application Ser. No. 08/586,338 (Russian Application Serial No. 95118821) of Vladimir O. Safonov entitled "TIP Technology and Its Application to SPARCcompiler Pascal."

3) U.S. application Ser. No. 08/585,815, now U.S. Pat. No. 5,758,163 (Russian Application Serial No. 95118820 of Vladimir O. Safonov entitled "Method and Apparatus for Records Fields Usage Checking at Compile Time."

BACKGROUND OF THE INVENTION

This application relates to a compiler and, specifically, to an LALR syntactical analyzer and semantic checker in a compiler for a high level computer programming language.

Conventionally, a high level computer programming language is described by a "grammar" for the language. A grammar is formed by a series of "productions." Each production has a left hand side (LHS), representing statement or construct in the language; a symbol (such as "→"); and a right hand side (RHS), representing a series of other statements or constructs that make up the LHS statement. For example, a first production in a grammar for the pascal programming language might be:

pascal_program→prog_header declarations block.

This production indicates that a pascal program consists of three parts: a program header, declarations of variables and constants, and a block that includes the actions performed by the program. A pascal program of the example is ended by a period (".").

A further production in the grammar might be:

prog_header→PROGRAM identifier (list_of_file_identifiers);

Thus, a program header consists of three parts: the word "prog", an identifier, and a list of zero or more file identifiers followed by a semicolon.

A compiler is a computer program that translates a "source program" written in a high level computer programming language that is easily understood by human beings into a "target program" executable by a computer. Typically, a compiler includes several functional parts. For example, a conventional compiler may include a lexical analyzer that looks at the source program and identifies successive "tokens" in the source program.

A conventional compiler also includes a parser/syntactical analyzer, which takes as an input a grammar defining the language being compiled and a series of actions associated with respective production of the grammar. The syntactical analyzer builds a "parse tree" for the statements in the source program in accordance with the grammar productions and actions. For each statement in the input source program, the syntactical analyzer generates a parse tree of the source input in a recursive, "bottom-up" manner in accordance with relevant productions and actions in the grammar. Thus, the parse tree is formed of nodes corresponding to one or more grammar productions. Generation of the parse tree allows the syntactical analyzer to determine whether the parts of the source program comply with the grammar. If not, the syntactical analyzer generates an error. Thus, the syntactical analyzer performs syntactical checking, but does not conventionally check the meaning (the "semantics") of the source program. One example of a conventional parsing technique is a LALR (lookahead, left right) syntactical analyzer, which is described in Chapter 4 of the treatise "Compilers: Principles, Techniques and Tools" by Aho, Sethi, and Ullman, the entirety of which is hereby incorporated by reference.

In conventional compilers, after the source program is parsed, it is input to a semantic analyzer, which checks for semantic errors, such as the mismatching of types, etc. The semantic analyzer evaluates, for example, "semantic attributes" of nodes of the parse tree. Attributes that are evaluated by looking at the attributes of their child nodes are called "synthesized attributes." After parsing and semantic analysis, the compiler generates intermediate code, optimizes the intermediate code and generates a target program.

It is important that compilers execute quickly and efficiently. In conventional compilers, the design of the semantic analyzer leads to inefficiencies of operation. Specifically, in conventional compilers, semantic attributes are evaluated in a separate parse tree-traversals during semantic analysis of the parse tree, after the parse tree has been completely constructed. Use of a separate tree-traversal for each semantic attribute causes an exponential increase in the amount of time required for compilation. Use of a separate pass for each semantic attribute requires the compiler to do a recursive descent through the parse tree for each attribute and an additional descent through the parse tree to do full semantic analysis and code generation. What is needed is a way to increase the efficiency of semantic analysis in a compiler so the execution time of the compiler is decreased.

SUMMARY OF THE INVENTION

The present invention overcomes the problems and disadvantages of the prior art by pre-evaluating certain semantic attributes during the operation of the syntactical analyzer, while the parse tree is being built, instead of waiting to evaluate these attributes during a separate pass through the parse tree in the semantic analyzer. The present invention modifies the format of nodes in the parse tree to include fields for certain semantic attributes and modifies the actions associated with the grammar productions and actions so that they create parse tree nodes of the correct format. In addition, the present invention includes semantic attribute routines, which are called while the parse tree is being built, and which determine what values should be stored in the parse tree for the various semantic attributes.

In accordance with the purpose of the invention, as embodied and broadly described herein, the invention is a method for parsing a source program, performed by a computer having a memory, the method comprising the steps of inputting a source code statement of the source program; determining a production that is related to the source code statement, the production stored in the memory and having an associated action that is also stored in the memory; creating a current parse tree node in the memory, during a parsing procedure, in accordance with the associated action, where the current parse tree node has a semantic attribute field; and storing, during the parsing procedure, in accordance with the associated action, a semantic attribute value in the semantic attribute field of the current parse tree node.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
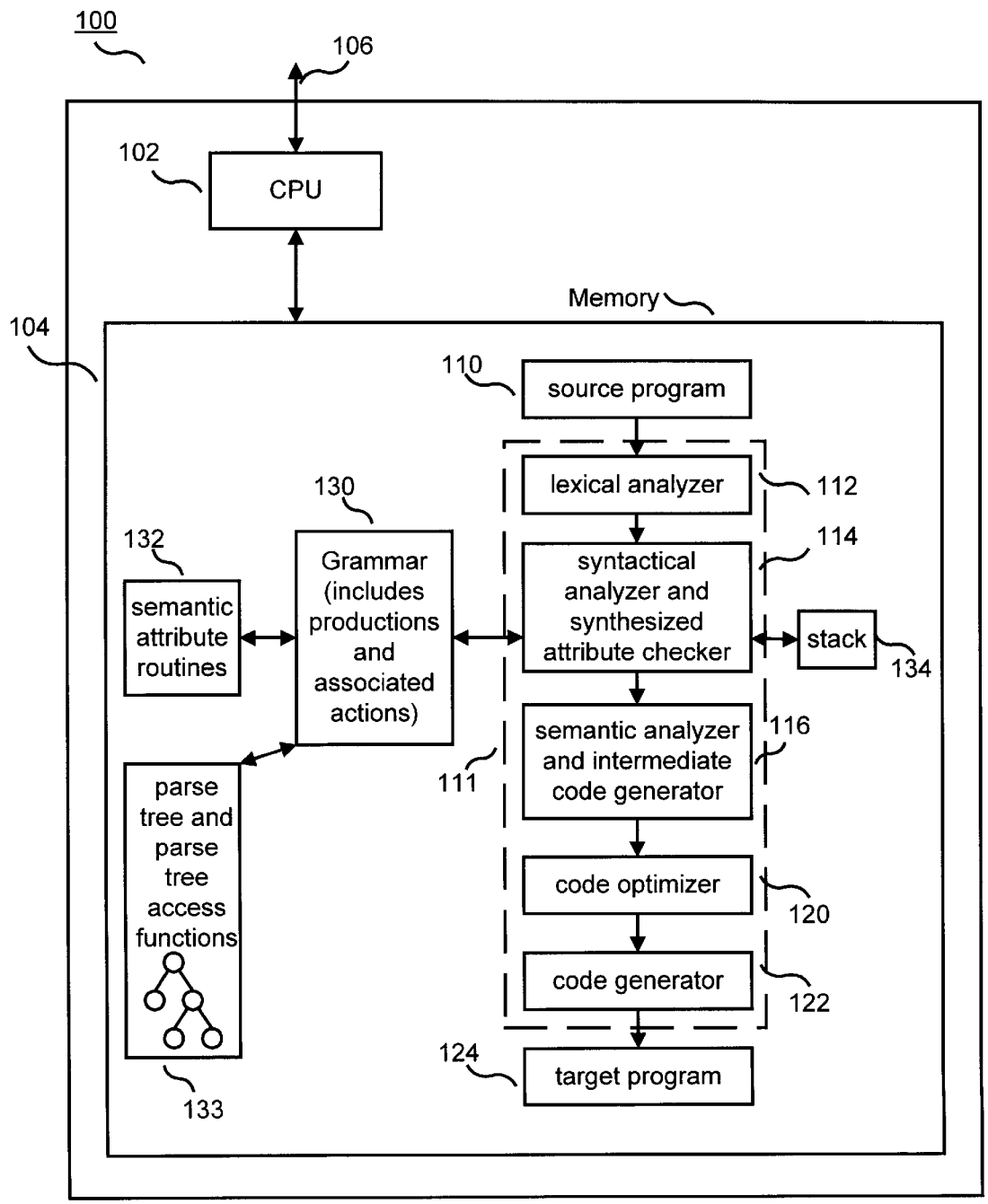
FIG. 1 is a block diagram of a computer system in accordance with a preferred embodiment of the present invention.

FIG. 1 is a block diagram of a computer system 100 in accordance with the present invention. Computer system 100 includes a CPU 102, a memory 104, and input/output lines 106. It will be understood by persons of ordinary skill in the art that computer system 100 can also include numerous elements not shown in the Figure for the sake of clarity, such as disk drives, keyboards, display devices, network connections, additional memory busses, additional CPUs, etc.

Memory 104 includes a source program 110, a compiler 111, and a target program 124. Compiler 111 includes a lexical analyzer 112, a syntactical analyzer 114, a semantic analyzer 116, a code optimizer 120 (optional), and a code generator 122. Compiler 111 inputs source program 110 and processes the source program to output target program 124. Compiler elements 112–116 operate for each statement in source program 110 to generate intermediate code.

As will be understood by a person of ordinary skill in the art, all parts of compiler 111 are embodied as instructions stored in memory 104 and performed by CPU 102. Syntactical analyzer 114 accesses a syntactical analyzer stack 134. Syntactical analyzer 114 uses a grammar 130 which includes productions and associated actions corresponding to the productions, as described below. The actions of the grammar generate and access the parse tree 133 by using a plurality of parse tree access functions 133 associated with the parse tree. Some actions of the grammar also access semantic attribute routines 132 to determine semantic attribute values which are stored in the parse tree, as described below.

Semantic analyzer 116 traverses the parse tree for the entire source program (or for a large part of the source program) created by syntactical analyzer 114 and recursively traverses the tree, calling appropriate semantic analysis routines.

Semantic analyzer 116 prints error messages and/or halts execution if semantic errors are found. If no semantic errors are found, semantic analyzer 116 outputs PCC trees in a manner known to persons of ordinary skill in the art. Intermediate code generator 116 translates the PCC trees into a front-end representation in a manner known to persons of ordinary skill in the art (e.g., Aho et al., "Compilers, Principles, Techniques and Tools," pp. 735–737). Code optimizer 120 (optional) optimizes this representation and outputs the front-representation in optimized form (for example, unused code fragments may be deleted). Code generator 122 preferably translates the front-end representation into target program 124 in a manner known to persons of ordinary skill in the art.

A type mismatch is an example of a semantic error. In, the pascal programming language, for example, multiplying an integer by a character is not allowed and is an example of a semantic error. In conventional semantic analyzers, semantic evaluation by semantic analyzer 116 of the type of an expression such as "1+2* a" would involve a traversal of the parse tree to check the types of "1", "2" and "a" and the type of the resulting sub-expression "2* a". In the present invention, the types of "1", "2", and "a", along with the type of the expressions "2* a" and "1+2* a" are pre-evaluated by syntactical analyzer 114 and stored in parse tree 133. Thus, semantic analyzer 116 does not have to perform multiple tree traversals during semantic analysis to determine whether a type mismatch has occurred and to evaluate the type of an expression.

Figure 2A:
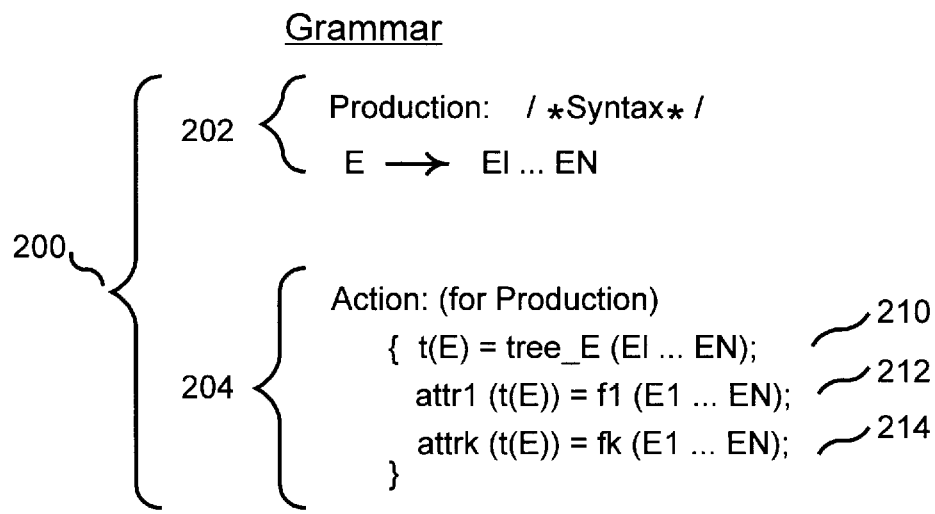
FIG. 2(a) shows a representation of a grammar, including productions and associated actions in accordance with the present invention.

FIG. 2(a) shows a representation of a grammar 200 for an expression, including productions 202 and associated actions 204 in accordance with the present invention. In the preferred embodiment, when compiler 111 is being constructed, grammar 202 and actions 204 are input to a conventional "compiler compiler," such as yacc, which generates syntactical analyzer 114 of FIG. 1. As syntactical analyzer 114 constructs the parse tree, an action 204 is executed for each production applied to a source program statement.

The format of a production 202 for the pascal programming language is discussed above. An action 204 creates t(E) 210, which is a parse tree node for the construct E. The node t(E) is constructed using a special parse tree access function 133 "tree_E", which creates and partially initializes a parse tree node for constructs of the class "E". In a preferred embodiment, the parse tree is created in a recursive, bottom-up fashion, so invocation of the tree_E function takes as arguments the lower nodes of the parse tree which have been already constructed by similar functions for sub-expressions E1 . . . EN.

Action 204 may also call semantic attribute routines f1 through fk to evaluate the semantic attributes. These routines assign values to semantic attributes attr1(t(E)) 212 through attrk(t(E)) 214 in the newly created parse tree node t(E).

Figure 2B:
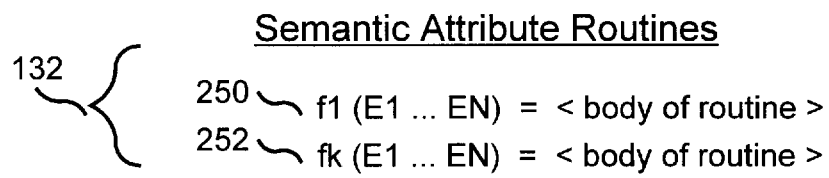
FIG. 2(b) shows a representation of semantic attribute routines in accordance with the present invention.
Figure 10:
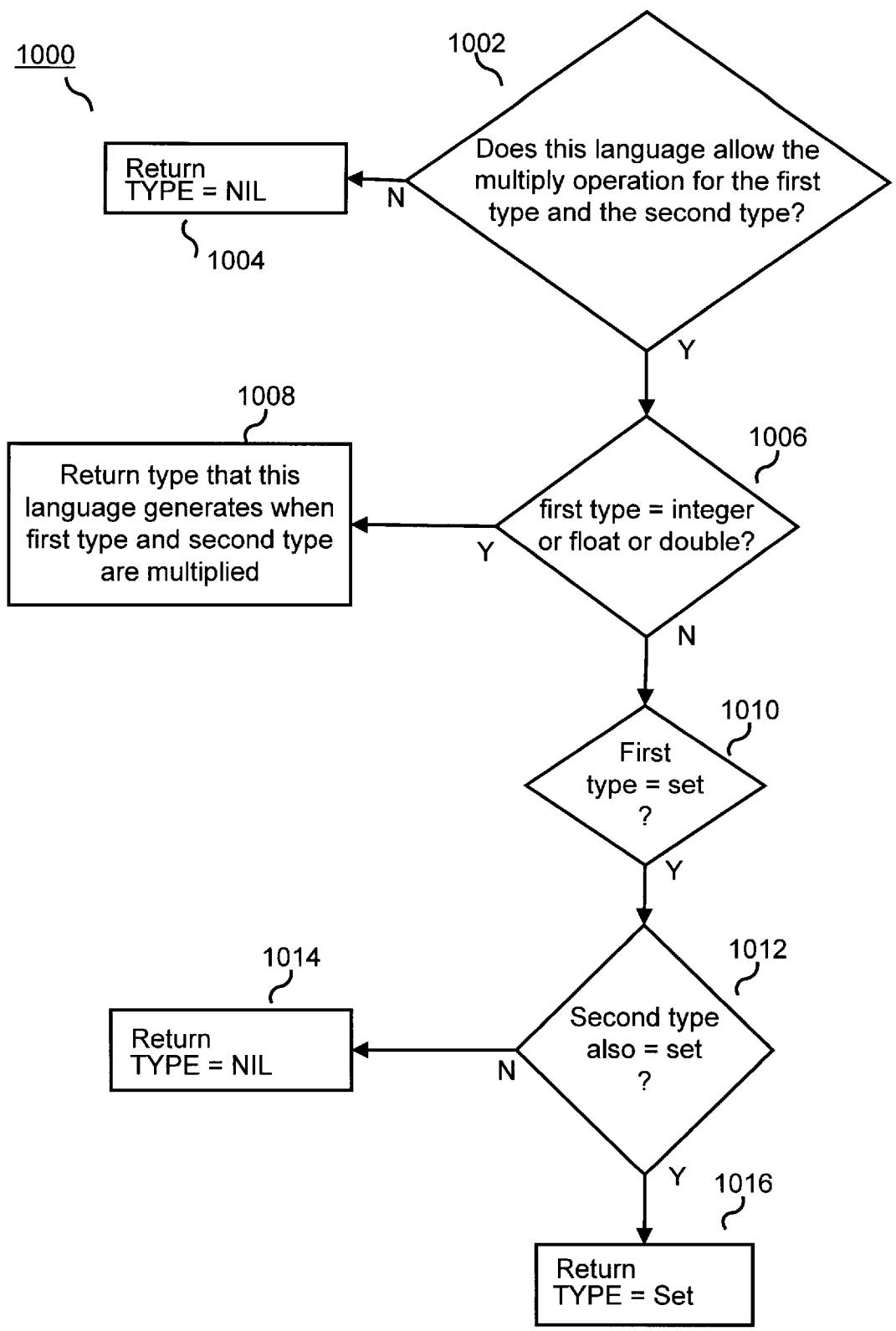
FIG. 10 shows a semantic attribute routine called by the steps of FIG. 9.

FIG. 2(b) shows a representation of semantic attribute routines 250, 252 in accordance with the present invention. A further example is shown in FIG. 10. The semantic attribute routines include f1 212 and fk 214, each of which was invoked by the actions 204 of grammar 200 either during or after the creation of a parse tree node.

Figure 3:
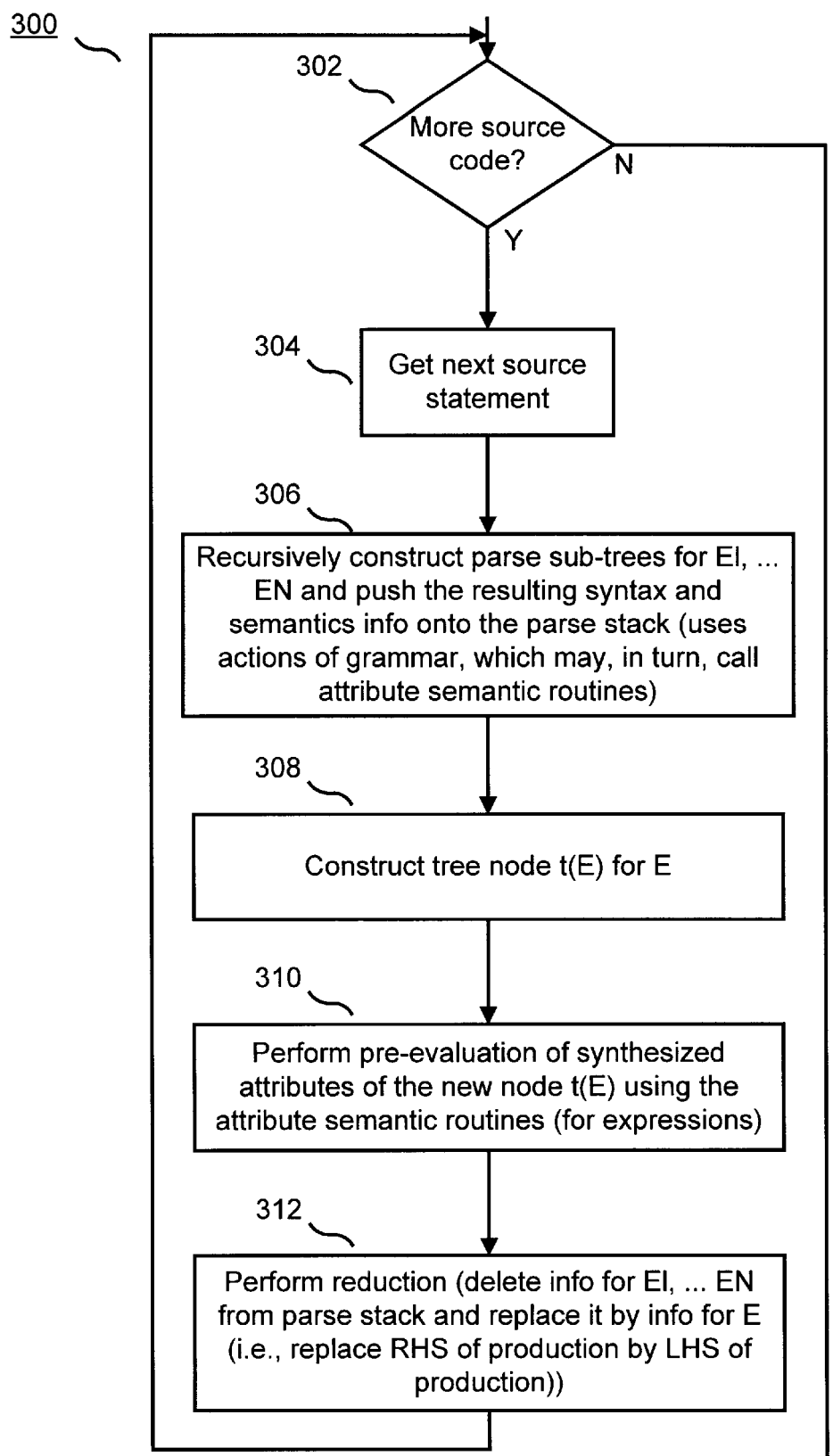
FIG. 3 is a flow chart showing steps performed by a compiler in accordance with the present invention.
Figure 4:
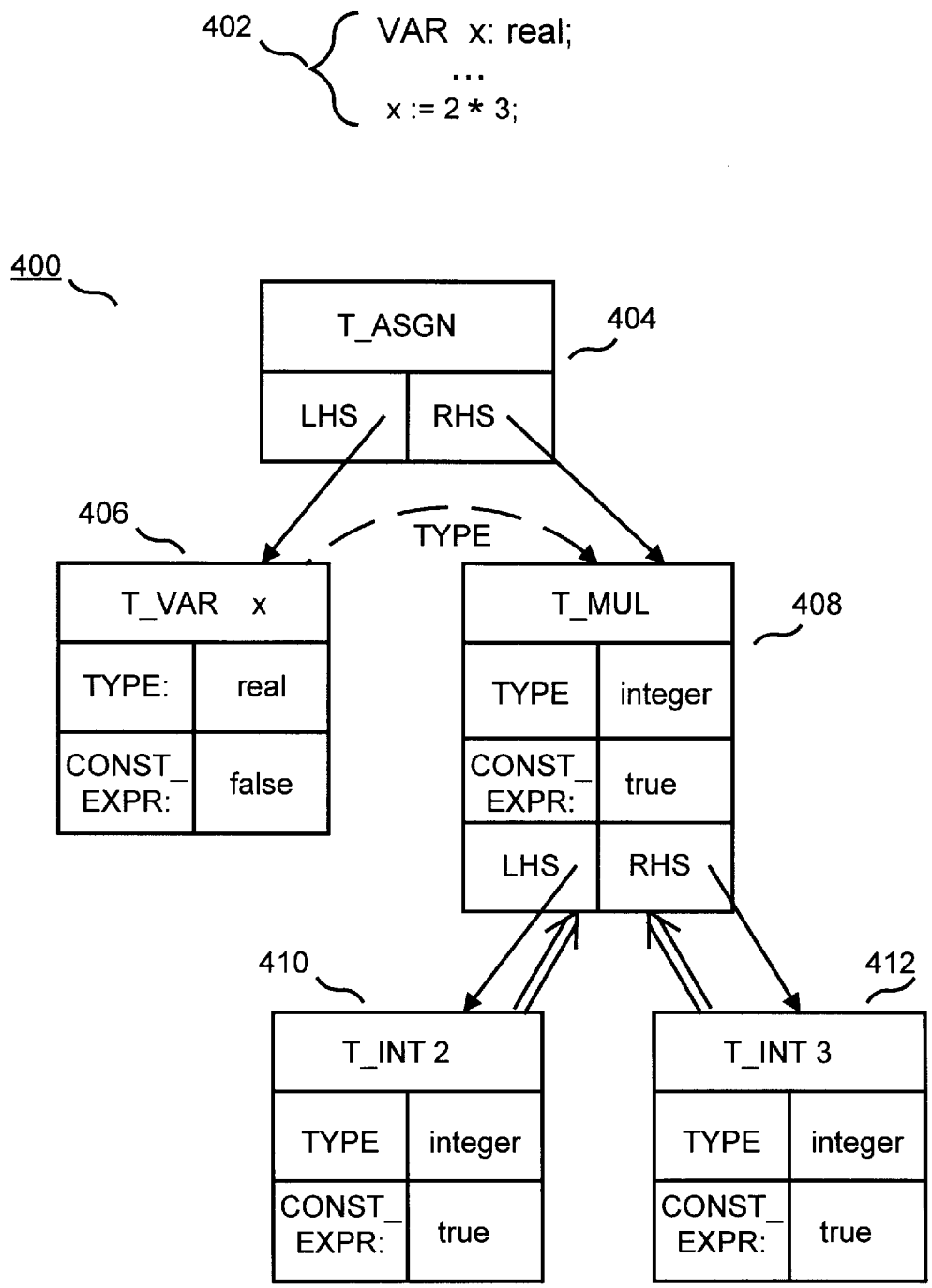
FIG. 4 shows an example parse tree, which includes fields for semantic attributes.

FIG. 3 is a flow chart 300 showing steps performed by a compiler in accordance with the present invention, to create a parse tree containing semantic attributes. FIG. 4 shows an example parse tree 400 created in accordance with the steps of FIG. 3. Some of the nodes of parse tree 400 include the semantic attributes TYPE and CONST_EXPR. In the described embodiment, TYPE is a semantic attribute representing a type of an expression (e.g., real, integer, etc.). CONST_EXPR is a flag attribute indicating whether the expression is a constant expression (e.g., "2," "3," etc.). Note that CONST_EXPR does not indicate whether a variable represents a constant. The input to the flow chart of FIG. 3 is source program 110 of FIG. 1 and the steps of FIG. 3 correspond to steps 112 and 114 of FIG. 1.

For the sake of example, assume that the input source statement is "x:=2*3;" where x had previously been declared as REAL. Thus, E is "x:=2*3;" in the example. As shown in step 302, the steps of FIG. 3 are performed until each statement of source program 110 has been processed. Step 304 inputs a next statement from source program 110. For the source statement "x:=2*3;", step 306 recursively constructs subtree nodes in the order indicated in FIG. 5 using actions (also called a "semantic rules") associated with each production used. Thus, as shown in FIG. 5(b), node 406 is created first, node 410 is created second, node 412 is created third, and node 408 is created fourth. As each node is created, and if the created node has semantic attributes, values are assigned to its semantic attributes TYPE and CONST_EXPR using semantic attribute routines.

Next, in step 308, a parse tree node 404 for the assignment production is created. In the example, nodes corresponding to assignment do not contain semantic attribute fields (TYPE or CONST_EXPR) and, therefore, no semantic checking is done during the creation of node 404. Additional semantic checking will be performed during step 116 of FIG. 1. Additional semantic checking will be preformed during step 116 of FIG. 1 (by an "assignment semantic routine") which checks for type compatibility between nodes 406 and 408 and generates intermediate code for the assignment. Because the semantic attributes are pre-evaluated and stored in the parse tree, step 116 can perform semantic checking very efficiently. Because the semantic attributes are pre-evaluated and stored in the parse tree, step 116 can perform semantic analysis very efficiently by extracting the TYPE attribute from T_MUL node 408 when needed, instead of traversing the expression tree just to evaluate its type.

It should be noted that, in a preferred embodiment, the format of the parse tree nodes is defined so that the semantic attribute values TYPE and CONST_EXPR are stored in a same location in all parse tree nodes that include semantic attributes. Thus, semantic analyzer 116 can easily access the semantic attribute values from the parse tree. Other embodiments of the present invention may use a different format for parse tree nodes.

FIGS. 6–11 show additional detail of the creation and evaluation of the nodes of FIG. 4, and of using the semantic attributes to perform simple semantic checks during syntactical analysis when the parse tree 400 is being constructed. The steps of FIGS. 6–11 are executed by syntactical analyzer 114 at the time parse tree 400 is being created for the source program statements "var x: real;" and "x:=2*3;".

Figure 5A:
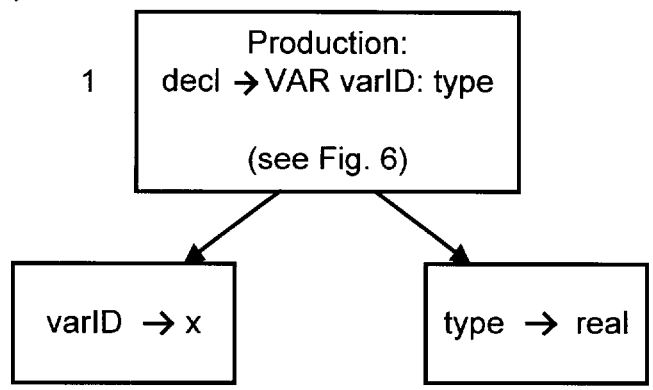
FIGS. 5(a) and 5(b) are representations showing an order of recursive processing of grammar productions in the compiler to yield the parse tree of FIG. 4.
Figure 5B:
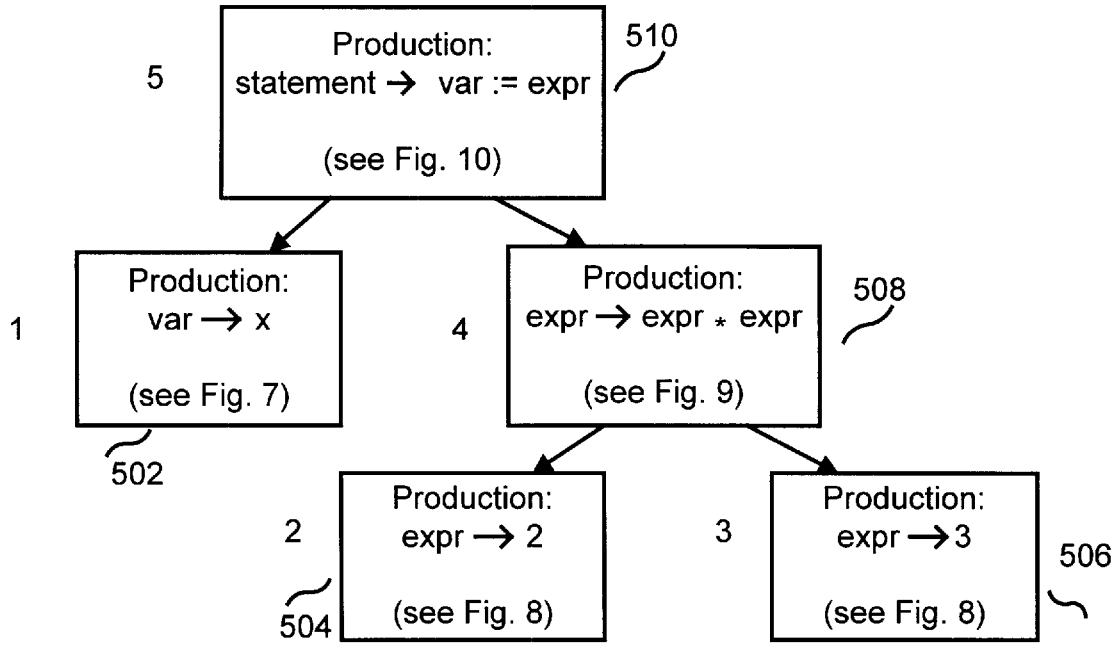
Figure 6:
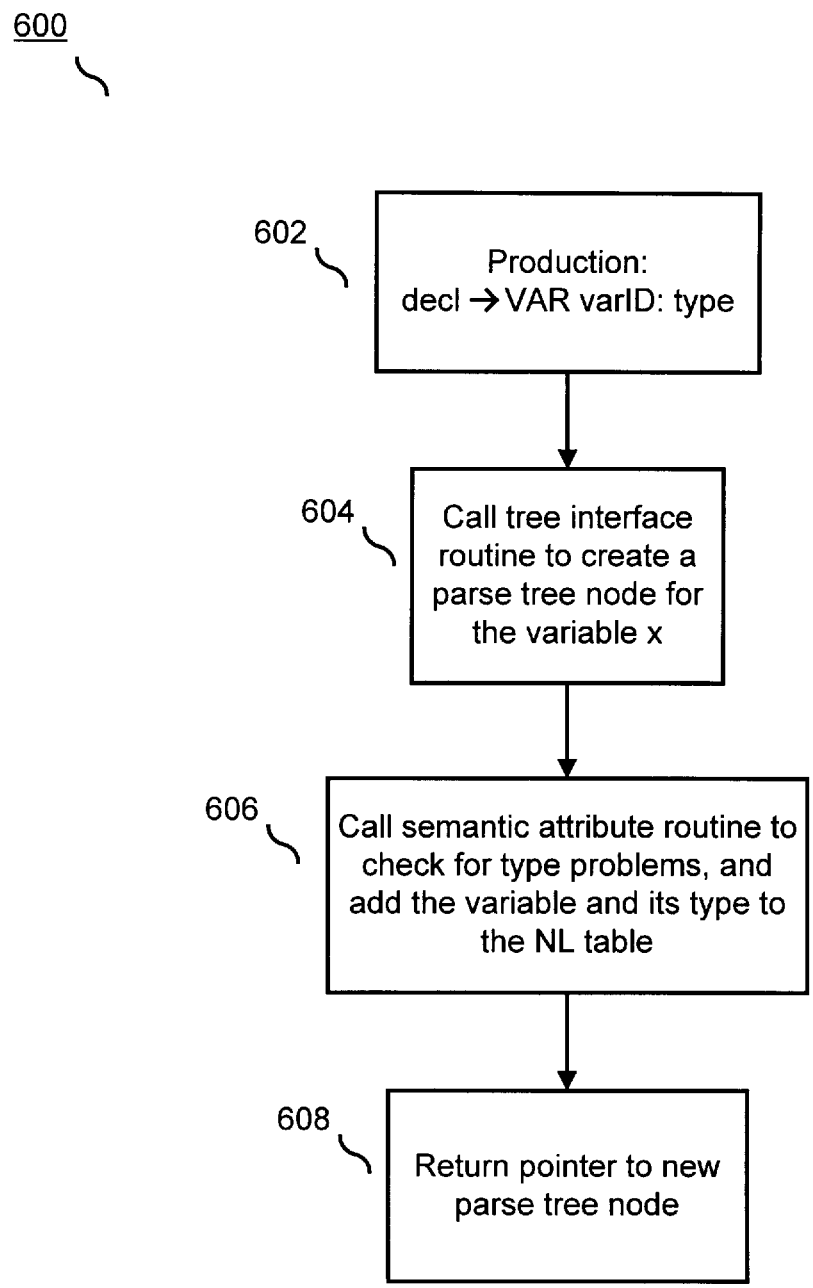
FIG. 6 shows a grammar production and an associated action performed in accordance with the processing of FIG. 5(a).

FIG. 6 shows a grammar production 602 and associated actions performed in accordance with the processing of FIG. 5(a) to create a node in a parse tree for the declaration of "x" (node not shown in FIG. 4). As shown in step 602, the relevant production is "decl→VAR varID: type". Step 604 executes a first action associated with this production. Thus, step 604 calls a parse tree access function 133 to create a new parse tree node for the variable "x". Step 606 calls a semantic attribute routine in routines 132 that checks for semantic problems, such as whether the declaration of the identifier "x" is unique or duplicated in the current block. Step 606 also creates an entry in a "name list" (NL) table stored in memory 104 that keeps track of variables and their types in a manner known to persons of ordinary skill in the art. Step 608 returns a pointer to the new parse tree node.

Figure 7:
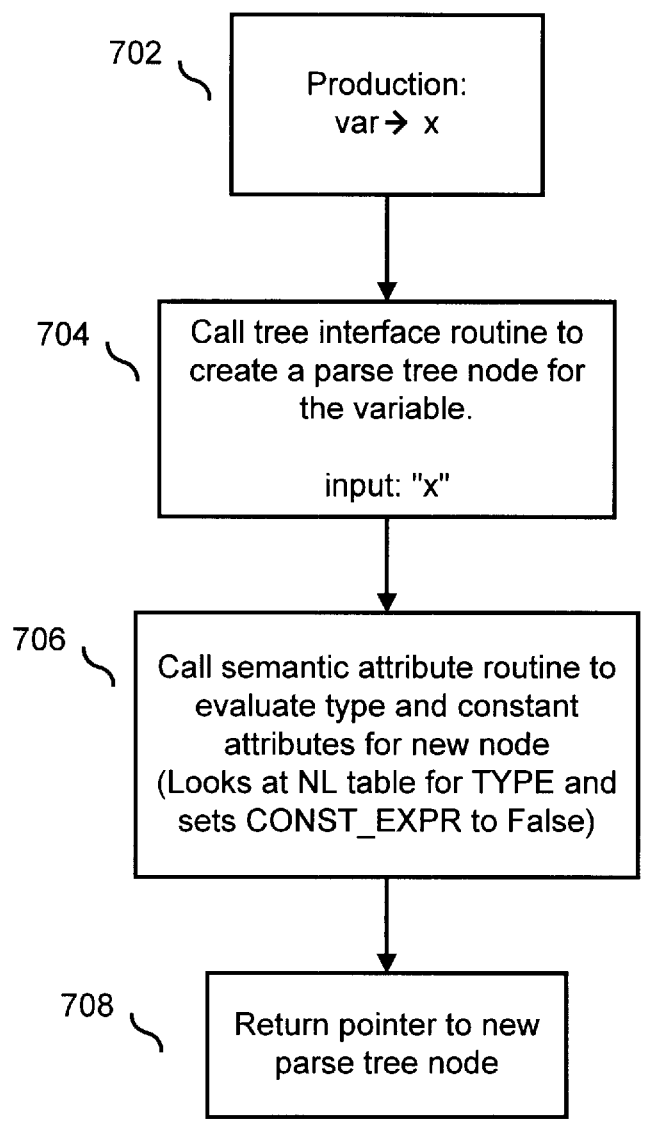
FIG. 7 shows a grammar production and an associated action performed in accordance with the processing of FIG. 5(b).

FIG. 7 shows a grammar production and an associated action performed in accordance with the processing of FIG. 5(b) to create node 406. As shown in step 702, the relevant production is "var→x". Steps 704 and 706 execute the actions associated with this production. Thus, step 704 calls a parse tree access function 133 to create new parse tree node for a variable. Step 704 passes the name of the variable ("x") to the parse tree node creation function, which creates node 406. Step 706 calls a semantic attribute routine 132 that determines the values of the semantic attributes TYPE and CONST_EXPR for the variable "x" and stores the values in the appropriate fields in node 406. Note that the node creation function for variables stores a TYPE value in accordance with the type of "x" in the name list (NL) table and stores a CONST_EXPR attribute value of "false" because the variable "x" is not a constant expression. Step 708 returns a pointer to the new parse tree node 406.

Figure 8:
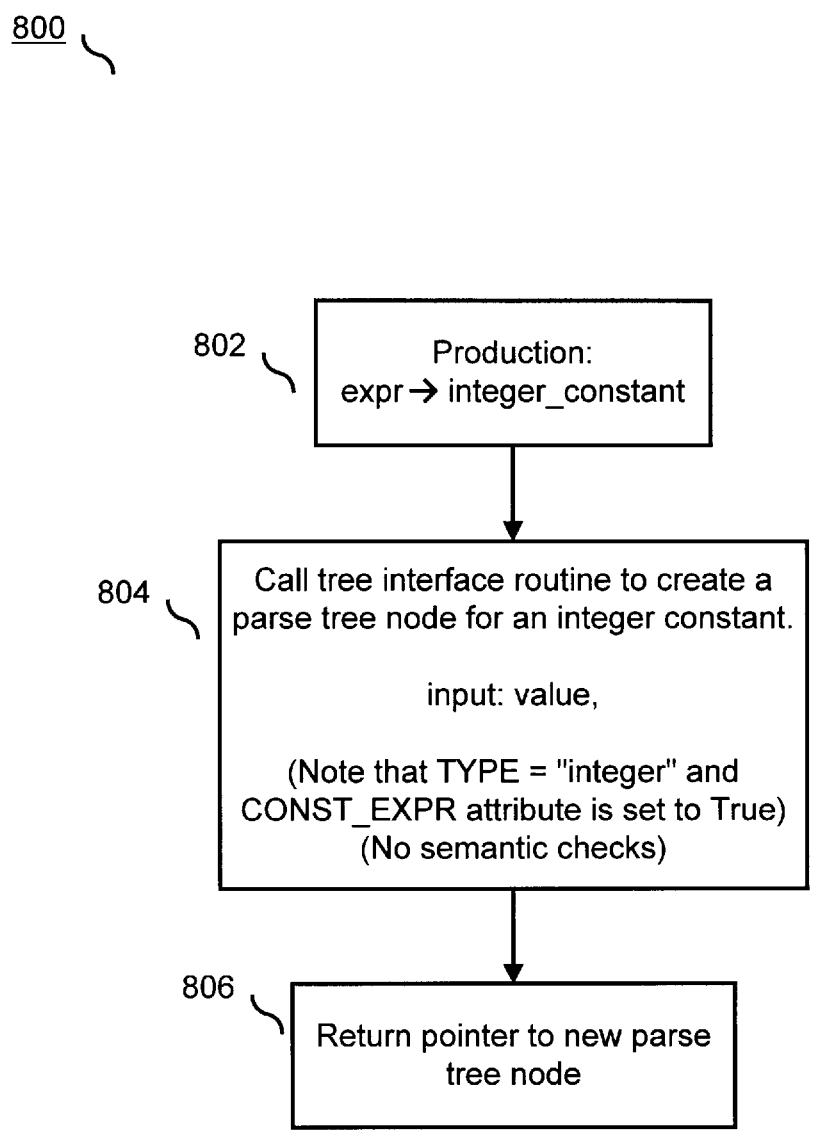
FIG. 8 shows a grammar production and an associated action performed in accordance with the processing of FIG. 5(b).

FIG. 8 shows a grammar production and an associated action performed in accordance with the processing of FIG. 5(b), which is called twice to create respective nodes 410 and 412. As shown in step 802, the relevant production is "expr→integer_constant". Step 804 executes the actions associated with this production. Thus, step 804 calls a parse tree access function 133 to create new parse tree node 410 or 412. In the example, step 804 passes the semantic attribute values into the function that creates the parse tree node. Note that an integer constant will always have a TYPE of "integer" and will always have a CONST_EXPR attribute value of "true" because an integer constant is a constant expression. Therefore, there is no reason to pass these values to the parse tree access function. Step 806 returns a pointer to the new parse tree node 410 (or 412).

Figure 9:
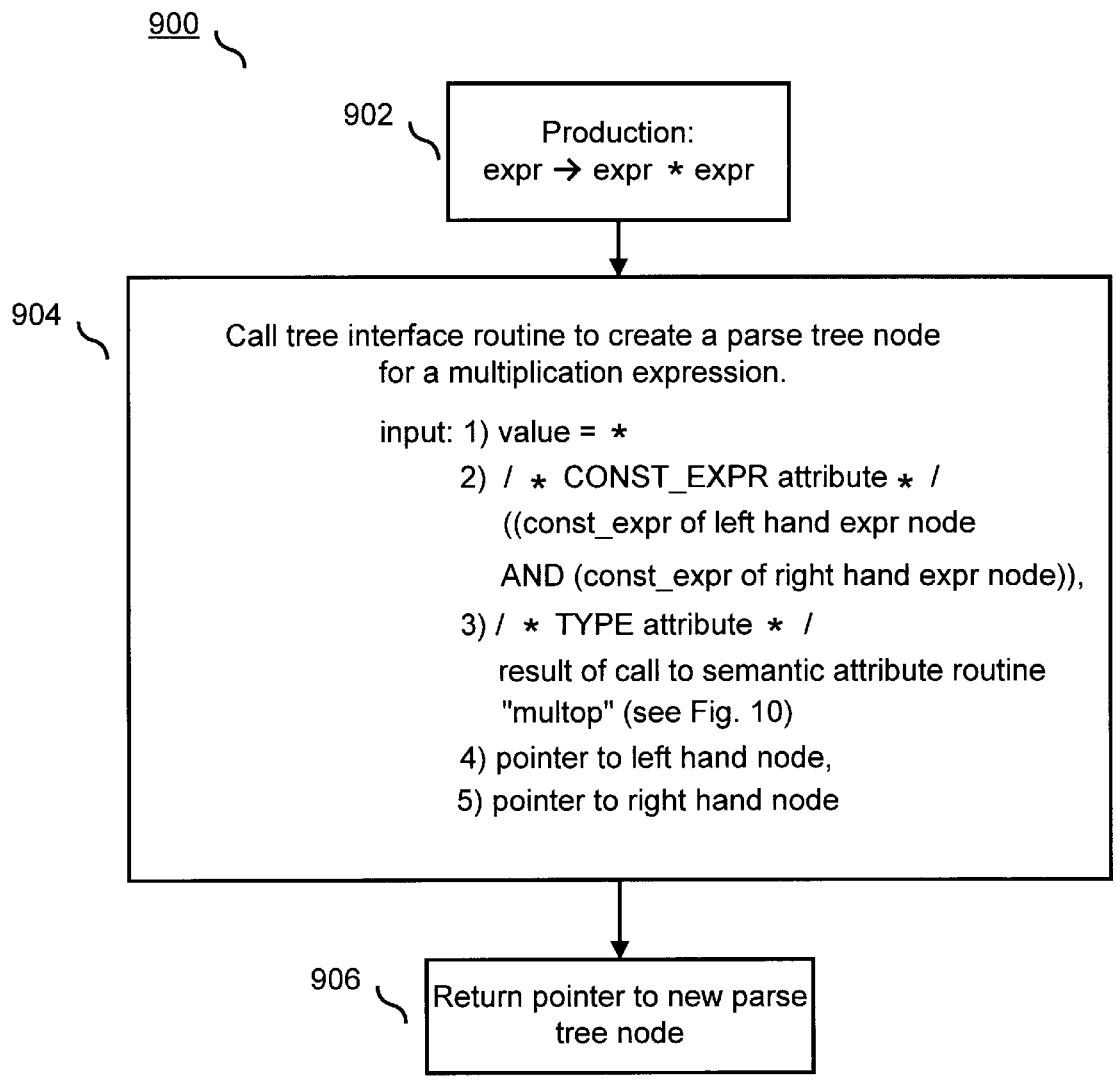
FIG. 9 shows a grammar production and an associated action performed in accordance with the processing of FIG. 5(b).

FIG. 9 shows a grammar production and an associated action performed in accordance with the processing of FIG. 5(b) to create, node 408. As shown in step 902, the relevant production is "expr→expr* expr". Step 904 executes the actions associated with this production. Thus, step 904 calls a parse tree access function 133 to create new parse tree node 408. Step 904 passes the semantic attribute values into the function that creates the parse tree node. Thus, step 804 passes to the node creation function: 1) a value of "*"; 2) a CONST_EXPR value created by logical ANDing the CONST_EXPR values of child nodes 410 and 412 (here, (true AND true) yields true); 3) a TYPE attribute value, which is a result of a function call to a semantic attribute function described in connection with FIG. 10 (here, integer*integer=integer); 4) a pointer to a first child node 410 (the result of the steps of FIG. 8); and 5) a pointer to a second child node 412 (the result of the steps of FIG. 8). The node creation function creates node 408 as shown in FIG. 4. Step 906 returns a pointer to the new parse tree node 408.

FIG. 10 is a flow chart 1000 of a semantic attribute routine that is called in step 904 of FIG. 9 to yield a TYPE value of a current node 408. The semantic routine looks at the TYPE of child nodes for the current parse tree and determines a TYPE attribute value resulting from a multiplication operation performed on the expressions corresponding to the child nodes. For example, here the expressions being multiplied are "2" (an integer constant) and "3" (an integer constant). If, in step 1002, it is determined that the multiplication operation is not allowed for the two expressions, then a value of NIL is returned in step 1004. This result may occur, for example, if an attempt is made to multiply a character by an integer, which is not allowed in the pascal programming language.

Otherwise, if multiplication is allowed, step 1006 determines if the first expression is of type integer, float, double or a similar numerical type. If so, step 1008 returns a TYPE value generated when the two expressions are multiplied. This determination is made in accordance with predetermined rules of the programming language being compiled. (Note that this value may be a valid TYPE or NIL, depending on the type of the second expression). For example, in pascal, an integer multiplied by an integer yields an integer.

As a further example, an integer multiplied by a real yields a real. Otherwise, in step 1010, if the first expression is of type "set," and the second expression is also of type "set" then a TYPE value of "set" is returned in step 1016. Otherwise, a TYPE value of NIL is returned in step 1014. It will be understood by persons of ordinary skill in the art that the flow chart of FIG. 10 is for purposes of example only and that many other sequences of steps could be performed to determine a TYPE semantic attribute value in accordance with the child nodes of a current node.

It should be appreciated that the semantic attribute routine of FIG. 10 does not print an error message if the source code 110 contains an improper multiplication. Instead, the steps of FIG. 10 simply returns a value of NIL, which is placed in the TYPE field of the newly created current parse tree node 408. When semantic analyzer 116 encounters a TYPE attribute of NIL during semantic analysis, it will determine that TYPE mismatching has occurred and print an appropriate error message.

For another embodiment, a grammar production and an associated action performed in accordance with the processing of FIG. 5(b) to create node 404. In this embodiment, the relevant production is "statement→var:=expr". This embodiment executes the actions associated with this production. Thus, this embodiment calls a parse tree access function 133 to create new parse tree node 404. Next, this embodiment passes to the node creation function: 1) a value of "T_ASGN"; 2) a pointer to a first child node 406 (the result of the steps of FIG. 7); and 3) a pointer to a second child node 408 (the result of the steps of FIGS. 9 and 10). Note that parse tree nodes for assignment statements preferably do not have semantic attribute fields. Next, this embodiment returns a pointer to the new parse tree node 404.

The steps of FIG. 3 are repeated until a parse tree has been created for the entire source program 110. All parse tree nodes corresponding to expressions contain the pre-evaluated semantic attributes TYPE and COST_EXPR.

In a preferred embodiment, the f1 . . . fk semantic attribute routines are invoked variously as function calls or as procedure calls. The result of a function call (e.g., a call to determine a type of an expression "2*3") is passed to the parse tree access function tree_E, which creates a new parse tree node with a semantic attribute value resulting from the function call (see FIG. 9). For example:

$$t(E) = \mathrm{tree\_}E( \ldots, f1( \ldots ), \ldots );$$

where f1 is a function that returns a semantic attribute value.

In contrast, a call to a separate semantic attribute procedure processes an entire parse tree node and pre-evaluates all of its synthesized attributes (see FIG. 7). For example:

$$\mathrm{create\_node}(t(E));$$

$$fk(t(E));$$

where t(E) is a newly created parse tree node and fk determines and stores all needed attribute values in the node.

Pascal programs include declarations, statements, and expressions. The grammar and actions of FIG. 2(a) apply to pascal expressions. In the described embodiment, simple pascal source code statements result in the creation of parse tree nodes, but these parse tree nodes do not contain semantic attributes (see, e.g., node 404 of FIG. 4). Other embodiments of the present invention may build parse tree nodes for statements, where the nodes include semantic attributes or other attributes used later in the compilation process.

For declaration and definition statements, the described embodiment creates a parse tree node, calls a semantic attribute routine that performs semantic checking, such as whether the declaration of the identifier is not duplicated in the current block, and creates an entry in a "name list" table that keeps track of variables and their types, as shown in FIG. 6.

In summary, a compiler in accordance with the present invention pre-evaluates the synthesized attributes TYPE and CONST_EXPR for expressions and stores them in the parse tree created during a syntactical analysis step. A later semantic analysis step uses the pre-evaluated semantic attributes and, thus, avoids having to traverse the parse tree to generate the semantic attributes. Use of pre-evaluated semantic attributes increases the efficiency of the semantic analyzer and decreases the execution time of the compiler. In a preferred embodiment of the present invention, which was implemented in connection with the Sun Microsystems operating system Solaris 2.5, it was a design goal of the semantic analyzer 116 was to make the pre-evaluation of semantic attributes transparent to the rest of the compiler. Thus, while the pre-evaluated attributes in the parse tree were used wherever possible within the semantic analyzer to avoid having to traverse the parse tree, their use did not appreciably alter the intermediate code generated by the semantic analyzer.

Other embodiments of the present invention will be apparent to those skilled in the art from consideration of the specification and practice of the invention disclosed herein. For example, the present invention can be used in connection with other kinds and other numbers of attributes. For example, the present invention may use a semantic attribute such as HAS_PTR(V) for a pascal component variable of the form:

V S1 ... SN (where Si, . . . , SN are component selectors).

In this example, HAS PTR is true if and only if there is a pointer reference selector "^" among S1, . . . , SN. Such a semantic attribute will avoid having to traverse the parse tree during semantic analysis to determine if the variable V has a component selector.

Moreover, is will be apparent to persons of ordinary skill in the art that the present invention can be used in connection with a compiler for any high level language that uses synthesized semantic attributes. It is intended that the specification and examples be considered as exemplary only, with a true scope of the invention being indicated by the following claims.

What is claimed is:

1. A method used during compilation of a source program that is written in a high level computer programming language, performed by a computer having a memory, the method comprising the steps of:

inputting a source code statement of the source program, the source code statement being written in the high level computer programming language, which has an associated grammar which includes productions and associated actions;

determining a production that is related to the source code statement, the production stored in the memory and having an associated action that is also stored in the memory;

creating a current parse tree node in the memory, during a parsing procedure, in accordance with the associated action of the grammar, where the current parse tree node has a semantic attribute field; and assigning and storing, during the parsing procedure, in accordance with the associated action of the grammar, a semantic attribute value in the semantic attribute field of the current parse tree node.

2. The method of claim 1, further including the step of performing lexical analysis between the inputting step and the determining step, to yield tokens and wherein the determining step is performed in accordance with the tokens.

3. The method of claim 1, wherein the step of storing a semantic attribute value includes the steps of:

determining a semantic attribute value of at least one child node of the current parse tree node, and determining the semantic attribute value of the current parse tree node in accordance with the determined semantic attribute value of the at least one child node.

4. The method of claim 1, where the storing step stores a semantic attribute value determined by a semantic attribute software routine.

5. The method of claim 4, where the semantic attribute routine is invoked by a function call.

6. The method of claim 4, where the semantic attribute routine is invoked by a procedure call.

7. The method of claim 1, further including the step of using the stored semantic attribute value in the parse tree during a semantic analysis procedure.

8. The method of claim 1, wherein the semantic attribute value indicates whether the source code statement is a constant.

9. The method of claim 1, further comprising the step of analyzing the semantic attribute value in the semantic attribute field to determine whether a compilation error has occurred.

10. An apparatus that is used while compiling a source program written in a high level computer programming language, comprising:

a memory provided to store at least one source code statement in the source program, the source code statement being written in the high level computer programming language that has an associated grammar which includes a plurality of productions and associated actions, and to store the plurality of productions and the associated actions;

a production determiner provided to determine a production of the plurality of productions that is related to the source code statement;

a first syntactical analyzer portion provided to create a current parse tree node, having a semantic attribute field, in the memory, during a parsing procedure, in accordance with the associated action of the grammar;

a second syntactical analyzer portion to store, during the parsing procedure, in accordance with the associated action of the grammar, a semantic attribute value in the semantic attribute field of the current parse tree node.

11. The apparatus of claim 10, further comprising a lexical analyzer to yield tokens of the source code statement, wherein the production determiner receives the tokens as input.

12. The apparatus of claim 10, wherein the second parsing portion further includes:

a portion provided to determine semantic attribute values of at least one child node of the current parse tree node, and a portion provided to determine the semantic attribute value of the current parse tree node in accordance with the determined semantic attribute values of the at least one child node.

13. The apparatus of claim 10, where the memory stores a semantic attribute value determined by a semantic attribute software routine.

14. The apparatus of claim 13, where the semantic attribute routine is invoked by a function call.

15. The apparatus of claim 13, where the semantic attribute routine is invoked by a procedure call.

16. The apparatus of claim 13, further comprising a semantic analyzer provided to perform semantic analysis of the source code statement in accordance with the stored semantic attribute value in the parse tree.

17. The apparatus of claim 10, wherein the semantic attribute value indicates whether the source code statement is a constant.

18. The apparatus of claim 10, further comprising the step of analyzing the semantic attribute value in the semantic attribute field to determine whether a compilation error has occurred.

19. A computer program product including:

a computer usable medium having computer readable code embodied therein for use during compilation of a source program that is written in a high level computer programming language, the computer program product comprising:

computer readable program code devices configured to cause a computer to effect inputting a source code statement of the source program, the source code statement being written in the high level computer programming language, which has an associated grammar which includes productions and associated actions;

computer readable program code devices configured to cause a computer to effect determining a production that is related to the source code statement, the production stored in the memory and having an associated action that is also stored in the memory;

computer readable program code devices configured to cause a computer to effect creating a current parse tree node in the memory, during a parsing procedure, in accordance with the associated action of the grammar, where the current parse tree node has a semantic attribute field; and computer readable program code devices configured to cause a computer to effect assigning and storing, during the parsing procedure, in accordance with the associated action of the grammar, a semantic attribute value in the semantic attribute field of the current parse tree node.

* * * * *